United States Patent
Kull

(10) Patent No.: US 8,428,798 B2
(45) Date of Patent: Apr. 23, 2013

(54) SHORT HEADWAY COMMUNICATIONS BASED TRAIN CONTROL SYSTEM

(75) Inventor: Robert C. Kull, Olney, MD (US)

(73) Assignee: Wabtec Holding Corp., Wilmerding, PA (US)

( * ) Notice: Subject to any disclaimer, the term of this patent is extended or adjusted under 35 U.S.C. 154(b) by 548 days.

(21) Appl. No.: 12/684,391

(22) Filed: Jan. 8, 2010

(65) Prior Publication Data

US 2011/0172856 A1 Jul. 14, 2011

(51) Int. Cl.
*G05D 1/00* (2006.01)
*B61L 15/00* (2006.01)

(52) U.S. Cl.
USPC .......................................... 701/19; 246/167 R

(58) Field of Classification Search ................ 701/19, 701/20, 1; 246/3–6, 14, 167 R, 187 C, 219, 246/2 R, 177
See application file for complete search history.

(56) References Cited

U.S. PATENT DOCUMENTS

| | | |
|---|---|---|
| 4,965,583 A | 10/1990 | Broxmeyer |
| 5,366,183 A | 11/1994 | Gill |
| 5,398,894 A | 3/1995 | Pascoe |
| 5,467,945 A | 11/1995 | Kubota et al. |
| 5,697,583 A | 12/1997 | Kane |
| 5,947,423 A | 9/1999 | Clifton et al. |
| 6,011,508 A | 1/2000 | Perreault et al. |
| 6,135,396 A | 10/2000 | Whitfield et al. |
| 6,195,023 B1 | 2/2001 | Walsh et al. |
| 6,249,724 B1 | 6/2001 | McCrary |
| 6,276,542 B1 | 8/2001 | McCrary |
| 6,332,107 B1 | 12/2001 | Gordon et al. |
| 6,539,292 B1 | 3/2003 | Ames, Jr. |
| 7,092,800 B2 | 8/2006 | Kane et al. |
| 7,139,646 B2 * | 11/2006 | Kane et al. ...................... 701/19 |
| 7,142,982 B2 | 11/2006 | Hickenlooper et al. |
| 7,188,057 B2 | 3/2007 | Birkelbach et al. |
| 7,200,471 B2 | 4/2007 | Kane et al. |
| 7,263,415 B2 | 8/2007 | Mindel |
| 7,340,328 B2 | 3/2008 | Matheson et al. |
| 7,458,545 B1 * | 12/2008 | Ricks et al. ................... 246/1 R |
| 2003/0034423 A1 * | 2/2003 | Hess et al. ................ 246/167 R |
| 2003/0120400 A1 * | 6/2003 | Ahmed Baig et al. .......... 701/19 |
| 2003/0222180 A1 | 12/2003 | Hart et al. |
| 2004/0010432 A1 | 1/2004 | Matheson et al. |
| 2004/0030466 A1 | 2/2004 | Rezk |
| 2004/0049327 A1 | 3/2004 | Kondratenko et al. |

(Continued)

FOREIGN PATENT DOCUMENTS

KR 20030068960 A 8/2003

*Primary Examiner* — Khoi Tran
*Assistant Examiner* — Jason Holloway
(74) *Attorney, Agent, or Firm* — The Webb Law Firm

(57) ABSTRACT

A train control system includes a communication device associated with at least one control unit located on a first train; and a communication device associated with at least one control unit located on a second train. At least one of the control units of the first train and the second train is configured to receive, at the associated communication device, an authority signal including data sufficient to identify one of the first train and the second train as a lead train and the other of the first train and the second train as a follower train, establish at least one peer-to-peer communication link between the communication devices of the lead train and the follower train, and exchange train data between the lead train and the follower train via the at least one peer-to-peer communication link. An on-board control unit is also disclosed.

26 Claims, 2 Drawing Sheets

U.S. PATENT DOCUMENTS

| | | | |
|---|---|---|---|
| 2004/0068361 A1* | 4/2004 | Cross et al. | 701/117 |
| 2004/0104312 A1* | 6/2004 | Hess et al. | 246/186 |
| 2004/0138814 A1 | 7/2004 | Rajaram | |
| 2004/0193336 A1 | 9/2004 | Sugita et al. | |
| 2004/0245410 A1* | 12/2004 | Kisak et al. | 246/3 |
| 2005/0121971 A1* | 6/2005 | Ring | 303/7 |
| 2005/0192720 A1 | 9/2005 | Christie et al. | |
| 2005/0251337 A1 | 11/2005 | Rajaram | |
| 2006/0041341 A1* | 2/2006 | Kane et al. | 701/19 |
| 2006/0074544 A1 | 4/2006 | Morariu et al. | |
| 2006/0155434 A1* | 7/2006 | Kane et al. | 701/19 |
| 2006/0195236 A1 | 8/2006 | Katsuta et al. | |
| 2007/0084972 A1 | 4/2007 | Riley et al. | |
| 2007/0162199 A1 | 7/2007 | Katsuta et al. | |
| 2007/0219680 A1* | 9/2007 | Kumar et al. | 701/19 |
| 2008/0128563 A1* | 6/2008 | Kumar et al. | 246/187 A |

* cited by examiner

SHORT HEADWAY COMMUNICATIONS BASED TRAIN CONTROL SYSTEM

BACKGROUND OF THE INVENTION

1. Field of the Invention

The present invention relates generally to management of trains operating within a track network, and in particular to a short headway communications based train control system for use in establishing a local communication link between two or more trains within the track network, and creating a virtual train that can be managed and controlled within this track network.

2. Description of the Related Art

As is known, and at any given time within a complex track network, multiple trains are operating and traversing the tracks. These trains are normally in communication with a central dispatch office, which issues movement and other control authorities to ensure safe operations of all of these trains in the track network. Further, each individual train may have an on-board communication and control system that facilitates the safe operation of the train in its local territory within the network. For example, these trains may communication with wayside devices through a radio link or a track-based communication link. In this manner, each individual train may be controlled and safely operated.

With reference to conventional fixed block signal systems, the distance between two following trains is limited, and based upon block sections, which ensure safe train separation. A "three aspect" signal system, as is presently widely deployed, requires two non-occupied block sections separating trains in following moves on the same track. In freight operations, these block sections are typically on the order of one mile of separation. Accordingly, following trains are normally operated with a following movement train separation of at least two to four miles, since the system cannot differentiate position in any greater precision than the fixed block length. Further, systems can be deployed with progressively smaller block sections, but the cost of installing the required wayside equipment, i.e., a wayside device for each block section, increases to the point where it is generally not economically feasible.

"Moving block" systems are also known and have been deployed in high-density transit applications, e.g., subways, which are generally based on a central office system that tracks each train and maintains a safe headway using centralized logic (i.e., a control unit at the central office). Such systems require a high-bandwidth data network between vehicles and the central office, as well as a high-cost and centralized failsafe computing environment and communications network. As is known, these "moving block" systems employed in the subway environment have not been effectively implemented in connection with freight train operations (which require a complex and widespread track system), primarily based upon the associated costs of implementation.

The progression from conventional signal systems to new Communications-Based Train Control (CBTC) systems has been based upon maintaining fixed block control, even without the need for wayside track circuits to define the blocks. For example, even in non-signal (or "dark") territory, by utilizing Track Warrant Control (TWC) procedures, trains are dispatched based upon an authority limited to a "virtual" block section, which is clear of other trains.

The Wabtec Electronic Train Management System (ETMS) is one example of a CBTC system, and has been applied as an overlay to Conventional Train Control (CTC) systems, as well as non-signal (TWC) territory. Further, ETMS has been expanded to support standalone vital applications (V-ETMS), which have the capability to operate as stand-alone failsafe control systems. Accordingly, this V-ETMS would be considered a replacement of both the conventional signal system and the track warrant control procedures. Such CBTC systems, including the Wabtec V-ETMS, may be used in one implementation of the present invention.

For example, the V-ETMS is operable to define progressively smaller "virtual" blocks as a means to support reduced headway operations. This provides system operation similar to that of a moving block system, as applied in metro-transit, e.g., subway, operations. However, such an implementation places an increased bandwidth demand on the communications network, which would require a significant investment in the upgrade of the communications infrastructure. Therefore, and in one aspect of the present invention, it is an object to provide such V-ETMS or CBTC functionality to support short headway train operations, without the need for a new or significantly upgraded communications infrastructure.

There are also known systems related to Distributed Power (DP) trains, which are supported by communication between locomotives, including radio-based communications for conventional trains and wire line-based communications for ECP-brake trains. The above-discussed limitations and drawbacks relating to fixed block signal systems have lead to railroads requiring an increased length in the trains as the best manner of increasing capacity. A DP train may be considered as operating two trains hard-coupled together (or as a zero-headway operation). However, one of the operating drawbacks associated such DP trains is the extra switching time relating to setting up the train for departure, as well as the need to break-up the train at the destination yard to fit within available tracks. This has lead to DP train operation largely limited to long unit trains, which can cycle without the need to be split on either end of the trip. Therefore, and in another aspect of the present invention, it is a further object to provide the ability to operate trains with short headway in an operation similar to a DP train setting, where the capacity advantages of long trains can be gained, while maintaining the flexibility of switching train sections or having diverging routes.

SUMMARY OF THE INVENTION

Generally, the present invention provides a short headway communications based train control system that overcomes some or all of the drawbacks and deficiencies associated with the known train operating and control systems. Preferably, in some aspects of present invention, provided is a short headway communications based train control system that provides additional and beneficial train control functionality. Preferably, in other aspects of the present invention, provided is a short headway communications based train control system that supports short headway train operations. Preferably, in further aspects of the present invention, provided is a short headway communications based train control system that provides CBTC functionality without the need for significantly upgraded communications architectures. Preferably, in still further aspects of the present invention, provided is a short headway communications based train control system that leads to increased capacity in freight operations. Preferably, in other aspects of the present invention, provided is a short headway communications based train control system that includes flexibility and other control features in both train switching and individual train control operations.

Accordingly, and in one preferred and non-limiting embodiment, provided is a train control system. The system includes: a communication device associated with at least one control unit located on a first train; and a communication device associated with at least one control unit located on a second train. At least one of the control units of the first train and the second train is configured to: (i) receive, at the associated communication device, an authority signal including data sufficient to identify one of the first train and the second train as a lead train and the other of the first train and the second train as a follower train; (ii) establish at least one peer-to-peer communication link between the communication devices of the lead train and the follower train; and (iii) exchange train data between the lead train and the follower train via the at least one peer-to-peer communication link.

In a further preferred and non-limiting embodiment, provided is a train control system, including: a central dispatch control unit having communication device and configured to transmit an authority signal; a communication device associated with at least one control unit of a first train; and a communication device associated with at least one control unit of a second train. At least one of the control units of the first train and the second train is configured to: (i) receive, at the associated communication device, the authority signal including data sufficient to identify one of the first train and the second train as a lead train and the other of the first train and the second train as a follower train; (ii) establish at least one peer-to-peer communication link between the communication devices of the lead train and the follower train; and (iii) exchange train data between the lead train and the follower train via the at least one peer-to-peer communication link.

In a still further preferred and non-limiting embodiment, provided is an onboard control unit for a train, including: a communication device configured to send and receive signals; and at least one computer having a computer readable medium having stored thereon instructions, which, when executed by a processor, causes the processor to: (i) receive, at the communication device, an authority signal including data sufficient to identify one of a first train and a second train as a lead train and the other of the first train and the second train as a follower train; (ii) establish at least one peer-to-peer communication link between the communication device of the train with a communication device of another train; and (iii) exchange train data between the train and the other train via the at least one peer-to-peer communication link These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
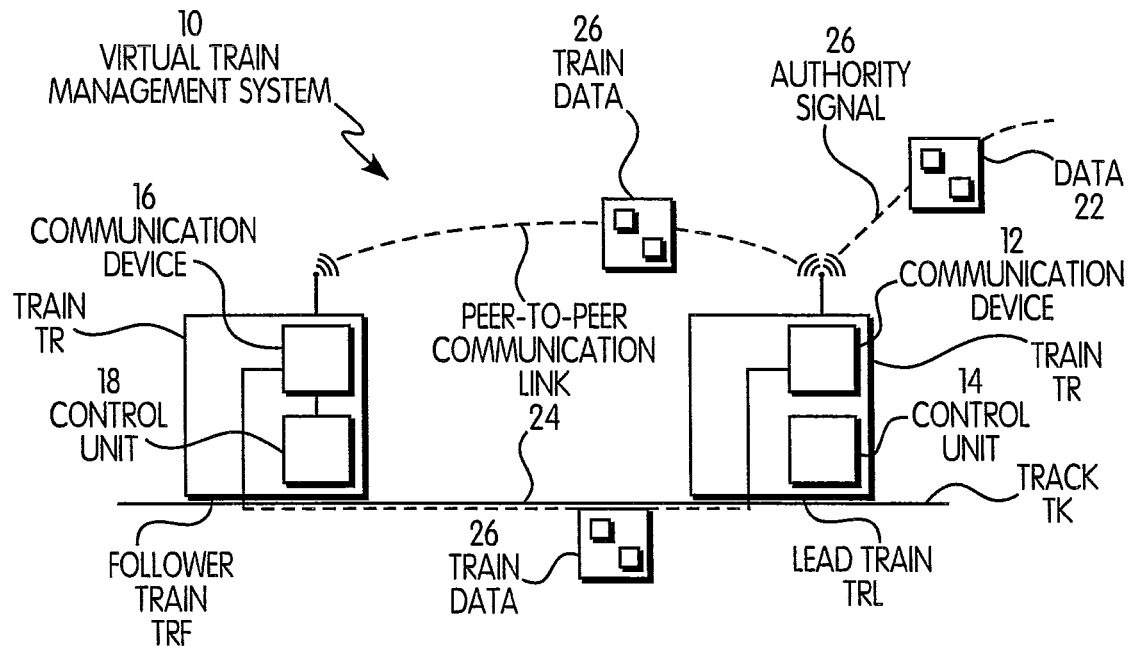
FIG. 1 is a schematic view of one embodiment of a short headway communications based train control system according to the principles of the present invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Further, it is to be understood that the invention may assume various alternative variations and step sequences, except where expressly specified to the contrary.

The present invention is directed to a short headway communications based train control system 10 that can be used in connection with multiple trains TR traversing a track TK, often in a complex track network. In addition, the short headway communications based train control system 10 of the present invention may be implemented in connection with any of the known operations of trains TR, such as freight operations, commuter operations, and the like. Still further, the present invention is equally useful in conventional fixed block signal systems, moving block systems, communications-based train control systems, non-signal territory, and/or as an integrated component of an existing communications-based train control system, such as the above-discussed ETMS or V-ETMS of Wabtec. Still further, and as discussed, the short headway communications based train control system 10 can be used in connection with Distributed Power trains, and the underlying communication architecture used in operating such trains.

It should be further recognized that the use of the term "control unit" hereinafter may refer to any specially-programmed general-purpose computing device having the appropriate and known components. For example, such a "control unit" may include computer readable storage media, a central processing unit (or microprocessor), various communication devices (as discussed hereinafter), and other individual devices and mechanisms for receiving, processing, and/or transmitting information and data. For example, in one preferred embodiment of the present invention, a short headway communications based train control system 10 may include one or more control units that are integrated with an existing on-board controller, a head-of-train unit, an end-of-train unit, or other computing device associated with train control, whether locally or at some centralized location.

One preferred and non-limiting embodiment of the short headway communications based train control system 10 of the present invention is illustrated in FIG. 1. In particular, this system 10 includes a communication device 12 integrated with, associated with, and/or in electronic communication with at least one control unit 14 located on a first train TR. In particular, and again, this control unit 14 may constitute or be integrated with an existing on-board controller (OBC), head-of-train, and/or end-of-train unit.

The system 10 further includes a communication device 16 integrated with, associated with, and/or in electronic communication with at least one control unit 18 located or positioned on a second train TR. In operation, at least one of these control units 14, 18 of the first train TR or second train TR is programmed or configured to receive, at the communication device 12, 16, an authority signal 20. This authority signal 20 includes data 22 sufficient to identify either the first or second train TR as the lead train TRL, and the other of the first or second train TR as the follower train TRF.

At least one of the control units 14, 18 is capable of initiating and establishing a peer-to-peer communication link 24 between the communication devices 12, 16 of the lead train TRL and the follower train TRF. In addition, at least one of the control units 14, 18 is programmed or configured to exchange train data 26 between the lead train TRL and the follower train TRF via this peer-to-peer communication link 24. In this manner, specified train data 26 can be exchanged betweens the lead train TRL and the follower train TRF on a local, i.e., peer-to-peer, level or link.

Figure 2:
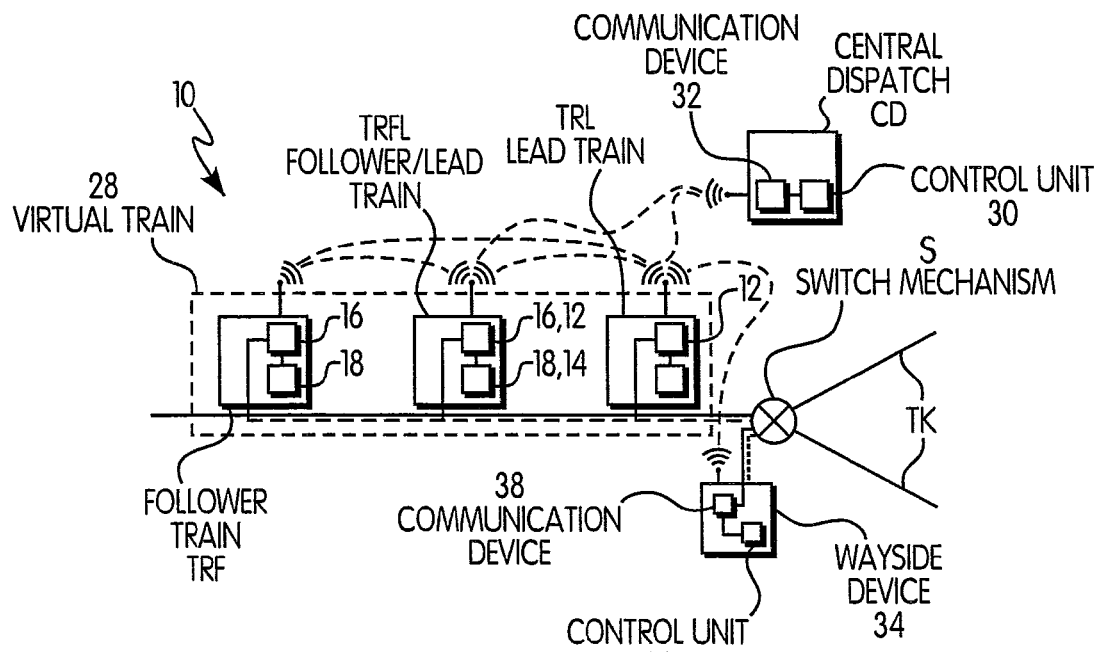
FIG. 2 is a schematic view of another embodiment of a short headway communications based train control system according to the principles of the present invention.

With reference to FIG. 2, and continued reference to FIG. 1, once this peer-to-peer communication link 24 is established, the lead train TRL and the follower train TRF can be designated as a single virtual train 28. This means that the "external" view of these two (or more) trains TR is a single, controllable virtual train 28.

As illustrated in FIG. 2, any number of trains TR can be established as a virtual train 28, or added to an existing virtual train 28. For example, a third train TR (having the above-discussed communication device 12, 16 and control unit 14, 18) can be added to or formed as part of the virtual train 28. In one preferred and non-limiting embodiment of operation, and after receiving the appropriate authority signal 20, the first train TR would continue to be the lead train TRL, while the second train TR would become a follower/lead train TRFL, i.e., the follower train TRF to the lead train TRL, and the lead train TRL to the third train TR (which would be designated as a follower train TRF). Accordingly, the peer-to-peer communication link 24 would be established between the follower/lead train TRFL and the follower train TRF. Of course, it is further envisioned that the lead train TRL may form a peer-to-peer communication link 24 with some or all of its follower trains, whether a follower/lead train TRFL or a follower train TRF. Alternatively, each train TR in the link may be considered a node for use in serially passing train data 26 from one train TR to another train TR. All such communication variations could be used in the context of the presently-invented short headway communications based train control system 10.

In the preferred and non-limiting embodiment of FIG. 2, the short headway communications based train control system 10 also includes a control unit 30 located at a remote central dispatch CD location. This central dispatch control unit 30 is integrated with, associated with, and/or in electronic communication with a communication device 32, which allows the central dispatch control unit 30 to transmit, process, and receive data. In the embodiment of FIG. 2, it is this central dispatch communication device 32 (as controlled by the central dispatch control unit 30) that transmits the authority signal 20 to one of the trains TR.

In one preferred and non-limiting embodiment, the authority signal 20 that is transmitted from central dispatch CD is received by the lead train TRL, and subsequently sent to the follower train TRF, such that the peer-to-peer communication link 24 can be established. Of course, it is envisioned that the authority signal 20 sent from the central dispatch control unit 30 can be sent only to the lead train TRL, which uses some local communication network or method to communicate this information and data to the follower train TRF. However, it may be preferable to ensure appropriate contact and transmission of the authority signal 20 to all trains TR involved in the creation and control of the virtual train 28.

As also illustrated in this embodiment, the short headway communications based train control system 10 may include communication with a wayside device 34, which also includes a control unit 36 and a communication device 38. In one embodiment, the control unit 36 is capable of controlling or selectively actuating a switch mechanism S. In operation, one or more of the trains TR in the virtual train 28 are capable of communicating with the communication device 38 of the wayside device 34 for use in ensuring safety and passage of the virtual train 28 (i.e., all of the trains TR that make up the virtual train 28) through the switch mechanism S. Without such communication, certain switch mechanisms S (or wayside devices 34) may determine that once the lead train TRL passes through the switch mechanism S, this switch mechanism S should be further actuated or otherwise reconfigured, which would "break up" or otherwise adversely affect the virtual train 28. Of course, and as discussed hereinafter, the communications between the virtual train 28, typically the lead train TRL, and the wayside device 34 controlling the switch mechanism S, further permit the desired splitting or uncoupling of the virtual train 28 back into the individual, discrete trains TR.

Figure 3:
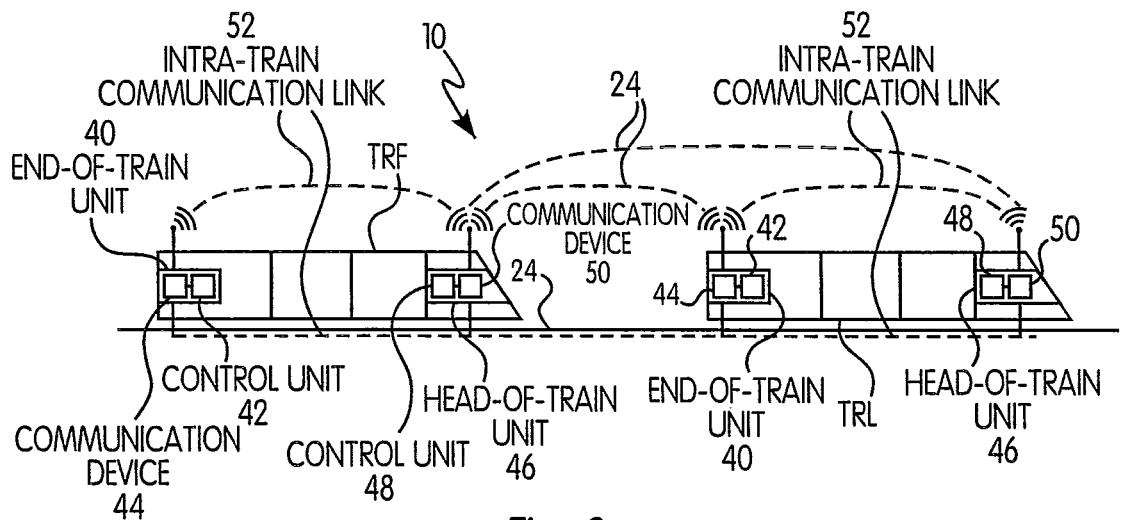
FIG. 3 is a schematic view of a further embodiment of a short headway communications based train control system according to the principles of the present invention.

In a further preferred and non-limiting embodiment, and as illustrated in FIG. 3, the short headway communications based train control system 10 may use existing or modified train equipment in order to implement the appropriate communication for establishing the virtual train 28. As shown, the short headway communications based train control system 10 may further include an end-of-train unit 40 positioned at a rear railroad car of the lead train TRL, and this end-of-train unit 40 would include a control unit 42 and a communication device 44. In addition, a head-of-train unit 46 is positioned at a locomotive of the lead train TRL, and this head-of-train unit 46 also includes a control unit 48 and a communication device 50. Again, the use of such a head-of-train unit 46 and end-of-train unit 40 in connection with the control and operation of a train TR is well known in the art, and provides an appropriate platform for implementing the short headway communications based train control system 10 of the present invention. As is also illustrated in FIG. 3, the follower train TRF also includes the end-of-train unit 40 and the head-of-train unit 46.

Accordingly, and in one preferred and non-limiting embodiment of the present invention, the communication device 44 of the end-of-train unit 40 of the lead train TRL is in communication with the communication device 50 of the head-of-train unit 46 of the lead train TRL (again, as is known in the art). In addition, the communication device 44 of the end-of-train unit 40 of the lead train TRL is in further communication with the communication device 50 of the head-of-train unit 46 of the follower train TRF. This allows for the appropriate flow of train data 26 across the established peer-to-peer communication link 24 between the trains TR.

Of course, it is further envisioned that the peer-to-peer communication link 24 is also (or alternatively) established between the communication devices 50 of the head-of-train units 46 of the lead train TRL and follower train TRF. In this embodiment, the communication link established between the individual train TR end-of-train unit 40 and head-of-train unit 46 would be considered an intra-train communication link 52, while the peer-to-peer communication link 24 is the communication link established between the lead train TRL and the follower train TRF, whether between the head-of-train units 46 of the trains TR, or the end-of-train unit 40 of the lead train TRL and the head-of-train unit 46 of the follower train TRF. This demonstrates that the existing equipment, i.e., the end-of-train unit 40 and the head-of-train unit 46 of the trains TR can be used in establishing the appropriate communication platform. In addition, the head-of-train unit may be part of or integrated with the on-board controller of the train TR.

By communicating and analyzing the appropriate train data 26 transmitted over the peer-to-peer communication link 24, it is possible to safely control the virtual train 28. Such train data 26 may include a variety of data sets and information, such as identification data, track data, train physical data, train operating data, train location data, end-of-train unit location data, speed, predictive data, brake away data, emergency braking data, communication link data, or any combination thereof. In one embodiment, at least one of the control units 14, 18 of the trains TR in the virtual train 28 is configured or used to calculate a safe braking distance between the lead train TRL and the follower train TRF. This allows for the safe separation and appropriate control of the trains TR comprising the virtual train 28. This calculation may be based upon certain additional train data 26, such as a full-service braking distance data of the follower train TRF, a safety factor, speed data of the lead train TRL, emergency braking distance data of the lead train TRL, a virtual train safety factor, certain communication link data, or any combination thereof. By having this peer-to-peer communication link 24, any acquired train data 26 can be transmitted, received, or analyzed in order to engage in the required control features, such as the calculation of a safe braking distance.

In another preferred and non-limiting embodiment, at least one of the control units 14, 18 is configured to receive an uncoupling signal that includes data sufficient to safely separate the lead train TRL and the follower train TRF. Accordingly, the virtual train 28 could then be split back into the individual, discrete trains TR. Such an uncoupling signal and method of safely disconnecting the trains TR could occur when approaching a switch mechanism S under the control of a wayside device 34. Accordingly, instead of allowing the entire virtual train 28 to pass through the switch on the same track, the lead train TRL and the follower train TRF could be split at the switch mechanism S back into the individually-controllable trains TR.

As is known in the art, the communication devices 12, 16, 32, 38, 44, and 50 may be in the form of a radio transceiver, such that the communication links established, whether the peer-to-peer communication link 24 or the intra-train communication link 52, are radio links. In addition, the train data 26 may be transmitted dynamically, i.e., as it is created, periodically, repeatedly, based upon the distance travelled, under certain emergency conditions, or any combination thereof. As expected, the more accurate and faster the train data 26 is transmitted, received, and analyzed over the peer-to-peer communication link 24, the more efficient and effective train control is achieved.

As discussed above, the control units 14, 18 may be part of an on-board control unit of the train TR. This on-board control unit may be or include any sort of computing device with the appropriate computer readable media and processor for implementing the computer instructions. Further, these control units 14, 18 may be integrated with or in the form of the existing end-of-train unit 40, the head-of-train unit 46, the on-board controller, or the like. In such an environment, the short headway communications based train control system 10 can use this existing equipment and be implemented through the modification of the programming instructions on any of these existing control units. In addition, these instructions can be hard-coded into the existing control units, loaded during certain maintenance procedures involving the trains TR, or sent from central dispatch CD as a downloadable patch or modification to the existing programming instructions.

Figure 4:
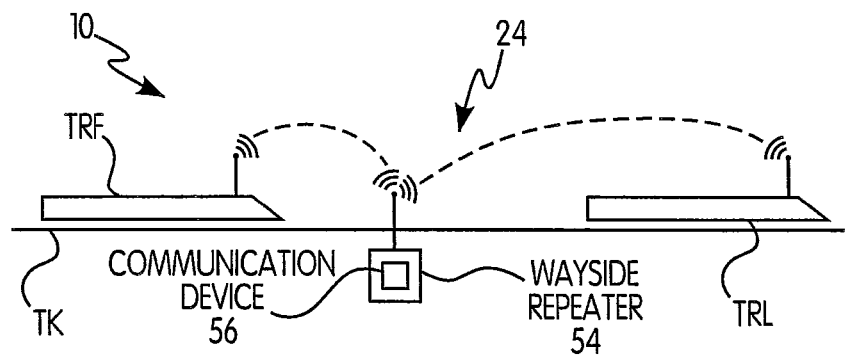
FIG. 4 is a schematic view of a still further embodiment of a short headway communications based train control system according to the principles of the present invention.

In a further preferred and non-limiting embodiment, and as illustrated in FIG. 4, certain territory or environments in the complex track network lead to interference, diminution, or failure in certain communication links, whether the peer-to-peer communication link 24 or the intra-train communication link 52. Accordingly, in such instances, one or more wayside repeaters 54 can be positioned along the track TK. This wayside repeater 54 would include a communication device 56, and be configured to receive the train data 26, and transmit this data 26 in the further establishment of the appropriate communication links. Therefore, such wayside repeaters 54 could be used to form the reliable peer-to-peer communication link 24 between the lead train TRL and the follower train TRF. In addition, the use of one or more wayside repeaters 54 would allow for the use of the presently-invented short headway communications based train control system 10 in any of the areas throughout the complex track network, including "dark" territory.

In another preferred and non-limiting embodiment of the present invention, one example of an implementation of the short headway communications based train control system 10 is provided. In particular, the various communication links used to support this implementation of the short headway communications based train control system 10 are shown in connection with a two-train short headway group, i.e., a lead train TRL and a follower train TRF. In addition, in this embodiment, the central dispatch CD and a wayside device 34 are used. It should be further noted that this wayside device 34 may be in the form of a discrete control system or other programmable unit capable of receiving, processing, and transmitting data signals.

Figure 5:
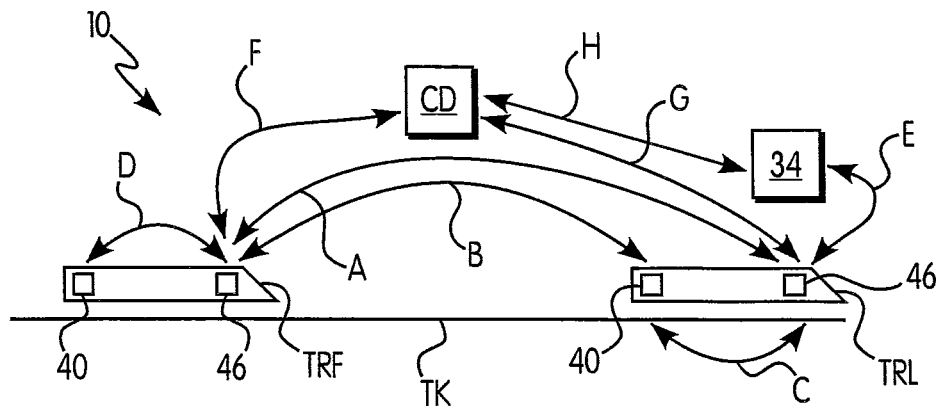
FIG. 5 is a schematic view of another embodiment of a short headway communications based train control system according to the principles of the present invention.

In addition, the various communication links illustrated in FIG. 5 can be implemented with many different specific technology alternatives. It is envisioned that one common application and technology base would be the use of ground-based data radio systems for all of the illustrated communication links. However, when using ECP-braked trains, links C and D could be replaced with wire line, i.e., rail-based, communications. Further, the communication links may be supplemented through the use of the above-discussed wayside repeaters 54 in selected areas to improve reliability. In any case, and in this embodiment, the communication system is designed based upon the maintenance of safe train operating procedures, even with the loss of communications.

In this embodiment, the central dispatch office CD provides authority signals 20 to both trains TR, and advises which is the lead train TRL and which is the follower train TRF (links G and F). The authority signal 20 is first given to the lead train TRL, followed by an authority signal 20 issued to the follower train TRF, with the identification of both the lead train TRL and the follower train TRF end-of-train unit 40 identifications. In addition, central dispatch CD would further advise the lead train TRL, i.e., the locomotive of the lead train TRL, of the identification of the locomotive of the follower train TRF.

In operation and in this embodiment, each train TR communicates between its own end-of-train unit 40 and its own lead locomotive having a head-of-train unit 46 (links C and D), as in standard train communication procedures. However, it is envisioned that this communication could be supplemented by GPS location data (latitude, longitude, equivalent earth reference, etc.) of the end-of-train unit 40. Such data could be used to cross-check train length and end-of-train location against the train length data, as provided in the locomotive from the initial train set-up. Further, such information or data could be provided through a communication from central dispatch CD and/or entry by the crew of the locomotive.

Still further, and in this preferred and non-limiting embodiment, the peer-to-peer communication link 24 between the lead train TRL and follower train TRF is accomplished through dual data links. In particular, a two-way data link A is established between each lead locomotive, i.e., the head-of-train unit 46 (or the locomotive on-board controller). The communications from the head-of-train unit 46 of the lead train TRL and the head-of-train unit 46 of the follower train TRF include periodic updates of end-of-train location data as referenced through the track database, and including current speed, as well as predicted "last car breakaway" emergency braking distance. Such communication is established on a broadcast basis with a set time or distance-travelled repeat rate. Further, the head-of-train unit 46 of the locomotive of the follower train TRF transmits information and train data 26 to the head-of-train unit 46 of the locomotive of the lead train TRL, including requests for location status updates, if required, between the scheduled broadcasts, or in the event of corruption or loss of the previous message.

The next communication link of this dual data link implementation is between the end-of-train unit 40 of the lead train TRL and the head-of-train unit 46 of the locomotive of the follower train TRF, as represented by two-way data link B. In this link, the end-of-train unit 40 of the lead train TRL broadcasts information. In particular, the same messages that are periodically broadcast to the head-of-train unit 46 of the lead train TRL (link C) are also received by the head-of-train unit 46 of the locomotive of the follower train TRF (link B). This communication may includes GPS location data, as discussed above. Still further, the head-of-train unit 46 of the locomotive of the follower train TRF communicates with the end-of-train unit 40 of the lead train TRL. Specifically, requests for location status updates are transmitted, if needed, between scheduled broadcasts, based upon short headway operation and related braking distance calculations.

After the peer-to-peer communication link 24 is established between a lead train TRL and a follower train TRF, these trains TR can be treated as a single long train, i.e., a virtual train 28, from the viewpoint of central dispatch CD and train control operation. The lead train TRL will interact with the wayside device 34 (and/or wayside control system), as well as the central dispatch office CD (links E and G) to govern movement authorities and authority signals 20. The follower train TRF would be governed by the same speed restrictions (permanent in the track database, as well as temporary from the central dispatch office CD), but movement authorities would continue to be based upon maintaining safe braking distance to the lead train TRL by the local peer-to-peer communication links 24.

Further, the safe braking distance calculation between the lead train TRL and the follower train TRF is performed in the head-of-train unit 46 (or on-board controller) in the locomotive of the follower train TRF. As discussed, this calculation may be implemented or accomplished through the use of different operating philosophies. First, a conservative approach may be taken, which is often referred to as a "brick wall" stop. In this approach, the speed of a lead train TRL is ignored, and it is assumed that every last location report is a stopped train TR. The separation distance is then based upon the full service braking distance of the follower train TRF, plus a safety factor, and use of the same algorithms as those for the limit of authority predictive braking enforcement. Another approach would be a "dynamic target" approach, which represents a more aggressive approach to support shorter headway operations. In this approach, the speed and "last car breakaway" emergency braking distance information from the lead train TRL are utilized to extend the stop target, and to allow shorter following moves.

Regardless of the approach, an additional distance margin may be required to be added related to the planned frequency of location messaging updates from the lead train TRL (links A and B) to avoid the need to initiate penalty braking in the follower train TRF in the event of a loss of a single update. In addition, and in practice, it is expected that initial applications would follow the "brick wall" stop approach and also add sufficient separation margin to support approximately one minute of lost communications before leading to some foam of penalty braking.

As also illustrated in connection with the preferred and non-limiting embodiment of FIG. 5, the "uncoupling" function is also implemented. Again, such an uncoupling or disconnection function allows for the short headway train groups, i.e., the virtual train 28, to return to operation as individually controlled trains TR. This would typically be done near the location of a switch mechanism S, which would allow each train TR to take diverging routes.

The uncoupling operation may be initiated by central dispatch CD with new movement authority limits sent to both the lead locomotive of the lead train TRL (link G) and following locomotive of the follower train TRF (link F). The follower train TRF would be provided with a new limit of authority, which could overlap the lead train TRL position. As long as there is an overlap of movement authority, both trains TR would continue the data exchanges over one or more of the peer-to-peer communication links 24. The follower train TRF would maintain safe braking distance to either the end of the lead train TRL, or to the limit of movement authority, whichever is less. When the lead train TRL fully clears the limit of movement authority for the follower train TRF, the uncoupling process would be complete, and each train TR is operated independently. At that point, the peer-to-peer communication links 24 (links A and B) would no longer be required. However, it is envisioned that continuing these peer-to-peer communication links 24 would continue in broadcast-only mode to provide redundant proximity warning functionality.

In this manner, the present invention provides a short headway communications based train control system 10 that can be used in a variety of situations and environments. For example, when referring to a CBTC system, such as the Wabtec V-ETMS, each locomotive would include an on-board track database, and utilize GPS and other inputs to self-locate itself on the track database. The locomotive also understands its consist, length, and both full service and emergency braking distance, as a function of speed, track, and other train parameters. In addition to locomotive sensor data, GPS location data may also be received from the end-of-train unit 40 through data radio communications, or wire line communication for ECP trains TR.

With reference to the Wabtec V-ETMS, the dispatching approach may be based upon movement authorities sent from central dispatch CD to each train TR, which defines the "virtual block" sections where the train TR has authority to move. In a block section between interlockings for normal "through moves," this would take the form of providing the authority to move as far as the next occupied block. As set forth above, the short headway communications based train control system 10 of the present invention permits central dispatch CD to grant a "following movement" authority to allow two (or more) trains TR to operate as a single control unit, i.e., a virtual train 28, through the block. In this case, the follower train TRF is provided with authority to follow the lead train TRL at a safe distance, without the need for further communications to central dispatch CD. Accordingly, from a central dispatch CD and wayside control viewpoint, both trains TR are considered as a single long train, in the same way as Distributed Power trains, which are hard-coupled.

Again, while the above description focuses on the use of two trains, i.e., a lead train TRL and a follower train TRF, the same concept can be extended to any number of follower trains TRF, where trains TR in the middle act as followers to their lead and leaders to the train immediately behind them. Once central dispatch CD has set up the appropriate authorities to the lead train TRL and follower train TRF, a communications network is set up on a local peer-to-peer basis between trains TR to exchange train data 26, as needed, to maintain safe train separation. Such communication may also be based upon or supplemented through the use of radio communications in DP trains between the lead and remote locomotives to maintain safe operation.

Further, the present invention provides the appropriate peer-to-peer communication links 24 to consider the lead train TRL and follower train TRF as "virtually" connected, such as to be treated as a single, long train from the viewpoint of central dispatch CD and the various wayside control systems. Safety is provided by the use of multiple levels of redundant communications to confirm locations and separation distance between the lead train TRL and the follower train TRF. This may further use safety-critical processing, such as can be supported by the Wabtec V-ETMS locomotive computing system.

In this manner, the presently-invented short headway communications based train control system 10 provides the ability to support shorter headway operation between trains TR with minimal ground infrastructure (which leads to a minimization of costs). Conventional fixed block signal systems require division into short block sections to support short headway train operation, which is not affordable for many long distance train operations. New communications-based train control systems, including the Wabtec ETMS in its current form, can support definition of a shorter "virtual blocks" to support shorter headway operations. However, such existing CBTC systems in similar approaches place a high demand on the local-to-central dispatch communications infrastructure, which can lead to increased costs based upon the need for a more complete data radio network coverage area, as well as an increase in the message loading.

Further, the present invention provides supportive functionality to existing CBTC systems with the result of an increased rail line capacity and the minimization of communications infrastructure. For example, office communications coverage would only be needed on a "spot coverage" basis to support setting up the initial linking between the lead train TRL and the follower train TRF. Once the lead train TRL and the follower train TRF are linked as a group, subsequent communications are provided on a peer-to-peer basis between the trains TR. This normally would not require any ground infrastructure, except in mountainous areas or tunnels, where wayside repeaters 54 may be used in a manner that is commonly applied to end-of-train units 40 and radio-distributed power communications. However, such wayside repeaters 54 can be "stand alone" and require minimal infrastructure support.

Still further, the short headway communications based train control system 10 of the present invention provides an alternative to the use of Distributed Power trains as a means to increase network capacity. Two trains with short headway operation can provide equivalent capacity increase as a single "double length" train with distributive power. However, in some instances, the time required to establish a link a DP train, as well as separate it in terminals, negate part of the capacity benefits. The short headway train of the present invention would take less time to establish and separate. For instance they are already physically separate and would be more practical to operate in some cases where DP is not practical to apply. In addition, two separate trains TR provide more flexibility in terms of available siding lengths, needs to support highway crossing, and other rail operating needs.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A train control system, comprising:
a communication device associated with at least one control unit located on a first train; and
a communication device associated with at least one control unit located on a second train;
wherein at least one of the control units of the first train and the second train is configured to:
(i) receive, at the associated communication device, an authority signal including data configured to identify one of the first train and the second train as a lead train and the other of the first train and the second train as a follower train;
(ii) establish at least one peer-to-peer communication link between the communication devices of the lead train and the follower train; and
(iii) exchange train data between the lead train and the follower train via the at least one peer-to-peer communication link.

2. The train control system of claim 1, wherein the lead train and the follower train are designated as a single virtual train.

3. The train control system of claim 2, further comprising at least one wayside device having at least one control unit configured to selectively actuate a switch mechanism, and at least one communication device associated with the at least one control unit and configured to receive train data associated with the virtual train.

4. The train control system of claim 1, further comprising a third train having at least one control unit in communication with a communication device, wherein at least one of the control units of the first train, the second train, and the third train is configured to:
receive, at the associated communication device, an authority signal including data sufficient to identify one of the first train and the second train as a lead train and the third train as a follower train;

establish at least one peer-to-peer communication link between the communication devices of the lead train and the follower train; and exchange train data between the lead train and the follower train via the at least one peer-to-peer communication link.

5. The train control system of claim 1, further comprising a central dispatch control unit configured to transmit the authority signal via a communication device.

6. The train control system of claim 1, further comprising:
an end-of-train unit positioned at a rear railroad car of the lead train and comprising a control unit and a communication device;
a head-of-train unit positioned at a locomotive of the lead train and comprising a control unit and a communication device;
an end-of-train unit positioned at a rear railroad car of the follower train and comprising a control unit and a communication device; and
a head-of-train unit positioned at a locomotive of the follower train and comprising a control unit and a communication device;
wherein the communication device of the end-of-train unit of the lead train is in communication with the communication device of the head-of-train unit of the lead train, and the communication device of the end-of-train unit of the follower train is in communication with the communication device of the head-of-train unit of the follower train.

7. The train control system of claim 6, wherein train data is transmitted over a peer-to-peer communication link established between the communication device of the head-of-train unit of the lead train and the communication device of the head-of-train unit of the follower train.

8. The train control system of claim 7, wherein the train data comprises at least one of the following: identification data, track data, train physical data, train operating data, train location data, end-of-train unit location data, speed, predictive data, breakaway data, emergency braking data, communication link data, or any combination thereof.

9. The train control system of claim 6, wherein the train data is transmitted over a peer-to-peer communication link established between the communication device of the end-of-train unit of the lead train and the communication device of the head-of-train unit of the follower train.

10. The train control system of claim 9, wherein the train data comprises at least one of the following: identification data, track data, train physical data, train operating data, train location data, end-of-train unit location data, speed, predictive data, breakaway data, emergency braking data, communication link data, or any combination thereof.

11. The train control system of claim 1, wherein the at least one control unit is configured to calculate a safe braking distance between the lead train and the follower train.

12. The train control system of claim 11, wherein the calculation is based at least in part upon at least one of the following: a full-service braking distance data of the follower train, a safety factor, speed data of the lead train, emergency braking distance data of the lead train, a virtual train safety factor, communication link data, or any combination thereof.

13. The train control system of claim 1, wherein at least one control units is configured to receive an uncoupling signal including data sufficient to separate the lead train and the follower train.

14. The train control system of claim 1, wherein the communication device of the first train and the second train is a radio transceiver, and the at least one peer-to-peer communication link is a radio link.

15. The train control system of claim 1, wherein the train data is transmitted on at least one of the following bases: dynamically, periodically, repeatedly, distance travelled, emergency, or any combination thereof.

16. The train control system of claim 1, wherein the train data comprises at least one of the following: identification data, track data, train physical data, train operating data, train location data, end-of-train unit location data, speed, predictive data, breakaway data, emergency braking data, communication link data, or any combination thereof.

17. A train control system, comprising:
a central dispatch control unit having communication device and configured to transmit an authority signal;
a communication device associated with at least one control unit of a first train; and
a communication device associated with at least one control unit of a second train;
wherein at least one of the control units of the first train and the second train is configured to:
(i) receive, at the associated communication device, the authority signal including data configured to identify one of the first train and the second train as a lead train and the other of the first train and the second train as a follower train;
(ii) establish at least one peer-to-peer communication link between the communication devices of the lead train and the follower train; and
(iii) exchange train data between the lead train and the follower train via the at least one peer-to-peer communication link.

18. The train control system of claim 17, wherein the authority signal is transmitted to the communication device of both of the first train and the second train.

19. The train control system of claim 17, wherein the central dispatch control unit designates the lead train and the follower train as a single virtual train.

20. The train control system of claim 19, wherein the communication device of the central dispatch control unit transmits at least one movement authority to the lead train, the at least one movement authority directed to movement of the virtual train.

21. The train control system of claim 19, further comprising at least one wayside device having at least one control unit configured to selectively actuate a switch mechanism, and at least one communication device associated with the at least one control unit and configured to receive train data associated with the virtual train.

22. The train control system of claim 17, wherein the communication device of the central dispatch control unit transmits an uncoupling signal including data sufficient to separate the lead train and the follower train.

23. The train control system of claim 22, wherein the uncoupling signal includes at least one of the following: identification data, track data, train data, authority limit data, movement authority data, or any combination thereof.

24. The train control system of claim 17, further comprising at least one wayside repeater configured to facilitate the peer-to-peer communication link in specified track locations.

25. An on-board control unit for a train, comprising:
a communication device configured to send and receive signals; and at least one computer having a computer readable medium having stored thereon instructions, which, when executed by a processor, causes the processor to:
- (i) receive, at the communication device, an authority signal including data configured to identify one of a first train and a second train as a lead train and the other of the first train and the second train as a follower train;
- (ii) establish at least one peer-to-peer communication link between the communication device of the train with a communication device of another train; and
- (iii) exchange train data between the train and the other train via the at least one peer-to-peer communication link.

26. The on-board control unit of claim 25, wherein the unit is in communication with or integrated with at least one of the following: an end-of-train unit, a head-of-train unit, an onboard controller, or any combination thereof.

* * * * *